United States Patent
Diaz et al.

(10) Patent No.: US 8,547,684 B2
(45) Date of Patent: Oct. 1, 2013

(54) PANELBOARD HAVING A PARALLEL FEEDER BARS DISTRIBUTION

(75) Inventors: Mauricio Diaz, Apodaca (MX); Ezequiel Salas, Apodaca (MX)

(73) Assignee: Schneider Electric USA, Inc., Palatine, IL (US)

( * ) Notice: Subject to any disclaimer, the term of this patent is extended or adjusted under 35 U.S.C. 154(b) by 805 days.

(21) Appl. No.: 12/640,777

(22) Filed: Dec. 17, 2009

(65) Prior Publication Data
US 2011/0149483 A1 Jun. 23, 2011

(51) Int. Cl.
*H02B 1/20* (2006.01)

(52) U.S. Cl.
USPC ............ 361/637; 361/624; 361/627

(58) Field of Classification Search
USPC ......... 174/149 B, 133 B, 68.2, 71 B, 88 B, 174/70 B, 99 B; 361/704, 611, 622, 624, 361/627, 637, 639, 648, 675
See application file for complete search history.

(56) References Cited

U.S. PATENT DOCUMENTS

| | | | |
|---|---|---|---|
| 2,511,995 A | 6/1950 | Robertson et al. | |
| 2,882,513 A | 4/1959 | Olashaw | |
| 2,986,676 A | 5/1961 | Edmunds | |
| 3,333,157 A | 7/1967 | Stokes | |
| 3,346,776 A | 10/1967 | Olashaw | |
| 3,375,411 A | 3/1968 | Mrowka | |
| 3,463,967 A | 8/1969 | Klein | |
| 3,588,620 A | 6/1971 | Waslleski | |
| 3,767,977 A | 10/1973 | Bachman | |
| 3,855,504 A | 12/1974 | Olashaw | |
| 3,858,092 A | 12/1974 | Olashaw et al. | |
| 4,079,439 A | 3/1978 | Coles et al. | |
| 4,118,754 A | 10/1978 | Duggan | |
| 4,142,225 A | 2/1979 | Diersing et al. | |
| 4,153,318 A | 5/1979 | Bishop et al. | |
| 4,167,769 A | 9/1979 | Luke et al. | |
| 4,242,718 A | 12/1980 | Shariff et al. | |
| 4,251,851 A | 2/1981 | Diersing et al. | |
| 4,262,163 A * | 4/1981 | Durrell et al. ............ 174/34 |
| 4,301,493 A * | 11/1981 | Schweikle et al. ............ 361/640 |
| 4,449,296 A | 5/1984 | Luke et al. | |
| 4,536,823 A | 8/1985 | Ingram et al. | |
| 4,602,312 A | 7/1986 | Takahashi | |

(Continued)

FOREIGN PATENT DOCUMENTS

| | | | |
|---|---|---|---|
| DE | 102007051647 | * | 4/2009 |
| GB | 1 392 607 | | 4/1975 |
| GB | 10 2007 051647 | | 4/2009 |
| WO | WO 00/36726 | | 6/2000 |

OTHER PUBLICATIONS

Siemens Power Distribution & Control, SPEEDFAX™ 2007-2008 Product Catalog "Panelboards" (7 pages).

(Continued)

*Primary Examiner* — Jinhee Lee
*Assistant Examiner* — Dimary Lopez
(74) *Attorney, Agent, or Firm* — Nixon Peabody LLP

(57) ABSTRACT

A load center includes a pair of generally parallel busbars for distributing a single phase of electricity to circuit breakers through a multitude of stabs that form respective bridges between the pair of busbars to provide respective bidirectional paths for dissipating heat from each of the stabs to both of the busbars and to provide a connection point for a pair of circuit breakers installed into the load center.

18 Claims, 11 Drawing Sheets

(56) References Cited

U.S. PATENT DOCUMENTS

| | | | |
|---|---|---|---|
| 4,636,915 A | 1/1987 | Perkins et al. | |
| 4,667,269 A | 5/1987 | Morby et al. | |
| 4,733,329 A | 3/1988 | Barner et al. | |
| 4,740,865 A | 4/1988 | Barner | |
| 4,783,718 A | 11/1988 | Raabe et al. | |
| 4,916,574 A | 4/1990 | Hancock et al. | |
| 5,046,173 A | 9/1991 | Wall | |
| 5,144,530 A | 9/1992 | Cohen | |
| 5,148,348 A | 9/1992 | White | |
| 5,181,165 A | 1/1993 | Gehrs | |
| 5,204,803 A | 4/1993 | Runge | |
| 5,272,591 A | 12/1993 | Blue | |
| 5,272,592 A * | 12/1993 | Harris et al. | 361/637 |
| 5,337,211 A | 8/1994 | Reiner | |
| 5,340,945 A | 8/1994 | Gehrs | |
| 5,343,356 A | 8/1994 | Hancock | |
| 5,420,749 A | 5/1995 | Gehrs | |
| D360,620 S | 7/1995 | Gehrs | |
| 5,444,183 A | 8/1995 | Gehrs | |
| 5,530,205 A * | 6/1996 | Parks et al. | 174/99 B |
| 5,744,751 A | 4/1998 | Kasai | |
| 5,805,414 A | 9/1998 | Feldhaeusser | |
| 5,835,341 A | 11/1998 | Rhodes | |
| 5,847,921 A | 12/1998 | Kim | |
| 5,936,833 A | 8/1999 | Grossman | |
| 5,969,937 A | 10/1999 | Rose | |
| 6,018,455 A * | 1/2000 | Wilkie et al. | 361/676 |
| 6,229,692 B1 | 5/2001 | Stendardo | |
| 6,266,232 B1 * | 7/2001 | Rose et al. | 361/645 |
| 6,301,094 B1 | 10/2001 | Soares | |
| 6,329,238 B1 | 12/2001 | Yamaguchi | |
| 6,603,075 B1 * | 8/2003 | Soares et al. | 174/72 B |
| 6,672,889 B2 | 1/2004 | Biermeier | |
| 6,781,818 B2 | 8/2004 | Josten | |
| 7,121,856 B2 | 10/2006 | Fontana | |
| 7,136,277 B2 | 11/2006 | Davis | |
| 7,244,143 B2 | 7/2007 | Wagener | |
| 7,256,984 B2 | 8/2007 | Kim | |
| 7,295,427 B2 | 11/2007 | Muhlbeger | |
| 7,329,813 B2 | 2/2008 | Josten | |
| 7,335,041 B2 | 2/2008 | Haubach | |
| 7,408,766 B2 | 8/2008 | Oesterhaus | |
| 7,448,885 B2 | 11/2008 | Wagener | |
| 7,468,883 B2 | 12/2008 | Mann | |
| 7,520,776 B2 | 4/2009 | Wagener | |
| 7,580,247 B1 * | 8/2009 | Pearson et al. | 361/624 |
| 7,719,823 B2 | 5/2010 | Josten | |
| 8,339,772 B2 * | 12/2012 | Peralta et al. | 361/676 |
| 2008/0049383 A1 * | 2/2008 | Fukunaga et al. | 361/612 |
| 2009/0178824 A1 | 7/2009 | Burguera | 174/68.2 |
| 2010/0000089 A1 | 1/2010 | Yang et al. | 29/854 |
| 2010/0007006 A1 | 1/2010 | Job Doraisamy et al. | 257/691 |
| 2010/0015512 A1 | 1/2010 | Inoue et al. | 429/99 |
| 2010/0038133 A1 | 2/2010 | Senk et al. | 174/72 |
| 2010/0039748 A1 | 2/2010 | Fufii et al. | 361/274.1 |
| 2010/0172117 A1 | 7/2010 | Imai | 361/820 |
| 2010/0202120 A1 | 8/2010 | Kita | 361/752 |
| 2010/0255360 A1 | 10/2010 | Umemoto et al. | 429/120 |
| 2010/0263915 A1 | 10/2010 | Shiraiwa et al. | 174/252 |
| 2010/0319958 A1 | 12/2010 | Latimer | 174/110 |
| 2011/0003517 A1 | 1/2011 | Akahori et al. | 439/801 |
| 2012/0113569 A1 | 5/2012 | Peralta et al. | 361/676 |

OTHER PUBLICATIONS

GE Panelboards "The Right Panelboard for Any Application" Apr. 2008 (6 pages).
Cutler-Hammer Panelboards "Lighting and Distribution Panelboards" Sep. 2000 (12 pages).
International Search Report, Application No. PCT/US2010/059400, 3 pages, dated Jul. 27, 2011.
International Written Opinion, Application No. PCT/US2010/059400, 4 pages, dated Jul. 27, 2011.

* cited by examiner

PANELBOARD HAVING A PARALLEL FEEDER BARS DISTRIBUTION

FIELD OF THE INVENTION

The present invention relates generally to electrical equipment and, more particularly, to electrical enclosures having a parallel feeder bars distribution.

BACKGROUND OF THE INVENTION

Electrical enclosures, such as, for example, load centers, typically house multiple circuit breakers and/or related electrical accessories. Load centers typically include one main feeder bar or busbar per phase of electricity. To accommodate single and/or multi-phase circuit breakers, most load centers include multiple stabs, where each stab is configured to connect two branch circuit breakers with one of the busbars. This connection inherently creates a thermal limitation because the heat contributed by the two circuit breakers for each stab has to be dissipated through a single dissipation path, from the stab itself to the main feeder busbar, which creates a localized temperature rise. To combat these temperature rises, busbars have been oversized to allow temperature rises to remain lower than maximum allowed levels per safety regulations. However, busbars are typically made of copper, which is an expensive metal, so increasing the size of the busbars increases the costs of manufacturing the load center.

Thus, a need exists for an improved apparatus. The present invention is directed to satisfying one or more of these needs and solving other problems.

SUMMARY OF THE INVENTION

The present disclosure is directed to providing a load center, which can also be known as a panelboard. The load center can be configured to accept different makes, models, sizes, and types of circuit breakers and related electrical accessories. The load center includes an outer housing for mounting the load center into a building, such as a residential house. The housing has various inputs/outputs to receive electrical wires. For a load center in a typical single family home, the housing is mounted between two studs in a wall. The housing receives one or more live electrical lines from an electrical utility company. Each live electrical line electrically couples with a respective pair of generally parallel busbars. The pairs of generally parallel busbars are insulated from the housing and are rigidly positioned within the housing. Each of the pairs of generally parallel busbars supplies one phase of electricity to circuit breakers and/or related electrical accessories that are plugged into the load center.

The present disclosure includes a first set or plurality of stabs that is connected between a first pair of generally parallel busbars such that each one of the first set of stabs forms a bridge between a first one of the first pair of generally parallel busbars and a second one of the first pair of generally parallel busbars. For a load center configured to distribute two or more phases of electricity, the present disclosure further provides a second pair of generally parallel busbars and a second set of stabs that is connected between the second pair of generally parallel busbars such that each one of the second set of stabs forms a bridge between a first one of the second pair of generally parallel busbars and a second one of the second pair of generally parallel busbars. For a load center configured to distribute three phases of electricity, the present disclosure further provides a third pair of generally parallel busbars and a third set of stabs that is connected between the third pair of generally parallel busbars such that each one of the third set of stabs forms a bridge between a first one of the third pair of generally parallel busbars and a second one of the third pair of generally parallel busbars. The first, the second, and the third pairs of generally parallel busbars are arranged within the housing such that the first, the second, and the third set of stabs are staggered along a central axis of the load center. Additionally, each of the first, the second, and the third set of stabs includes a circuit breaker connecting surface. The circuit breaker connecting surfaces of each of the first, the second, and the third set of stabs can be coplanar. Each of the stabs of the present disclosure provide a respective bidirectional path for dissipating heat to the two generally parallel busbars connected thereto. Such bidirectional heat dissipation allows for a reduction in the size of busbars, which can result in material cost savings.

According to some embodiments a load center includes a housing, a first busbar, a second busbar, and a set of stabs. The first busbar is positioned within the housing for distributing a first phase of electricity entering the load center. The second busbar is positioned within the housing for distributing the first phase of electricity. The second busbar is generally parallel to the first busbar and electrically connected thereto. Each of the set of stabs is electrically connected to the first busbar and the second busbar.

According to some embodiments, a load center includes a housing, a first pair of generally parallel busbars, a first set of stabs, a second pair of generally parallel busbars, a second set of stabs, and a first insulating layer. The first pair of generally parallel busbars is positioned within the housing for distributing a first phase of electricity. The first set of stabs is physically and electrically connected between the first pair of generally parallel busbars. The second pair of generally parallel busbars is positioned within the housing for distributing a second phase of electricity. The second set of stabs is physically and electrically connected between the second pair of generally parallel busbars. The first insulating layer is positioned between the first pair of busbars and the second pair of busbars to electrically insulate the first phase of electricity from the second phase of electricity. The first and the second pairs of busbars are arranged within the housing such that the first set of stabs and the second set of stabs are staggered.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
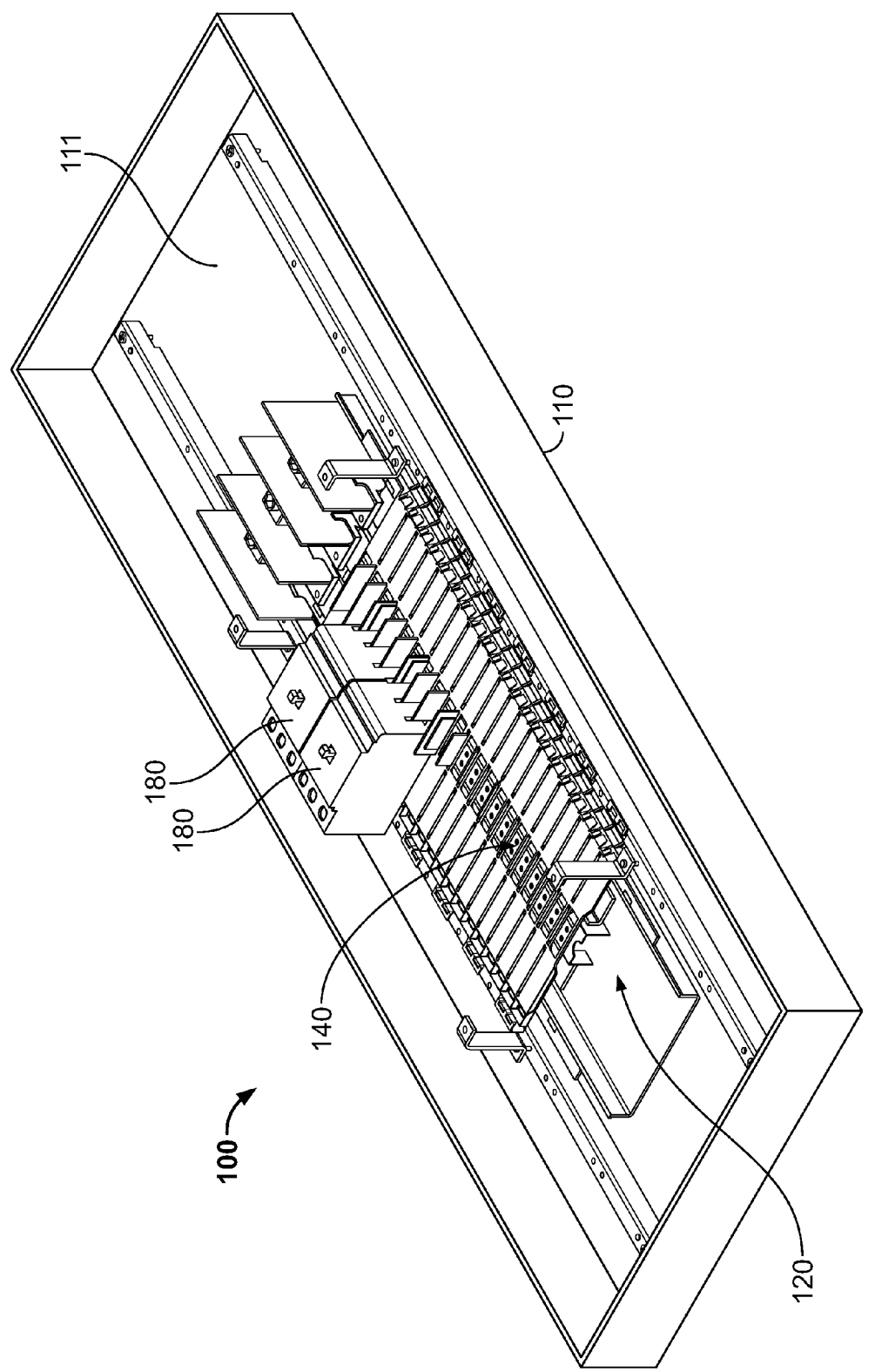
FIG. 1 is a perspective view of a load center according to some aspects of the present disclosure.

Referring to FIG. 1, an electrical enclosure or a load center 100 is shown according to the present disclosure. The load center 100 includes a housing 110. The housing 110 can be made of a variety of materials including metal, plastic, fiberglass, and the like. The housing 110 can include a hinged door (not shown) or other means of sealing and/or covering the contents of the load center 100. The housing 110 can also include an insulating base or pad 111 to cover all of or a portion of an interior surface of the housing 110. The insulating base 111 is configured to electrically insulate the contents of the load center 100 from electrically conductive items outside the housing 110 (e.g., metal wall studs, screws, wires, etc.).

The load center 100 includes three pairs of generally parallel busbars 120 and three corresponding sets of stabs 140 (shown in more detail in FIG. 3A, discussed below), which are implemented to distribute three-phase power in the load center. That is, each pair of busbars and corresponding set of stabs are provided to supply a separate and distinct phase of electricity to one or more circuit breakers 180 coupled to the load center 100. By generally parallel, it is meant that each pair of busbars 120 is designed and installed to be substantially parallel to one another, understanding that the practical limitations of mechanical and human imperfections can cause the busbars to be slightly skewed. As shown in FIG. 1, the circuit breakers 180 coupled with the load center 100 are three-phase circuit breakers; however, it is contemplated that the load center 100 can receive and supply power to single-phase circuit breakers, dual-phase circuit breakers, three-phase circuit breakers, or a combination thereof.

While specific numbers of pairs of busbars 120 and corresponding stabs 140 are described herein and shown in the Figures, it is contemplated that the load center 100 can include any number of pairs of busbars 120 and corresponding stabs 140. For example, in some embodiments, the load center 100 is a single-phase load center that includes only one pair of busbars 120 and one corresponding set of stabs 140. For another example, the load center 100 is a dual-phase load center that includes two pairs of busbars 120 and two corresponding sets of stabs 140. For yet another example, the load center 100 is a three-phase load center that includes three pairs of busbars 120 and three corresponding sets of stabs 140.

Figure 2:
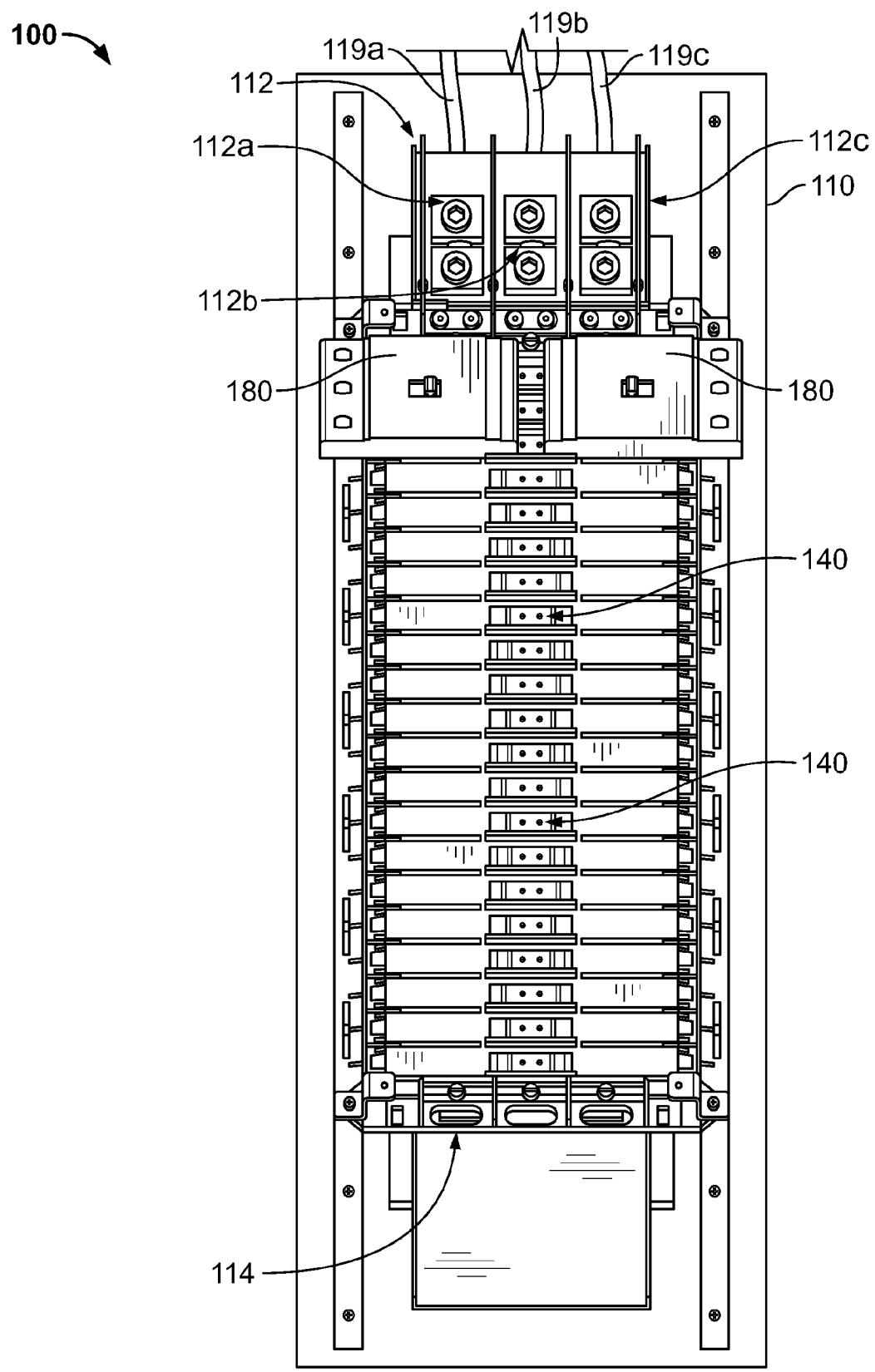
FIG. 2 is a top view of the load center of FIG. 1 according to some aspects of the present disclosure.
Figure 3A:
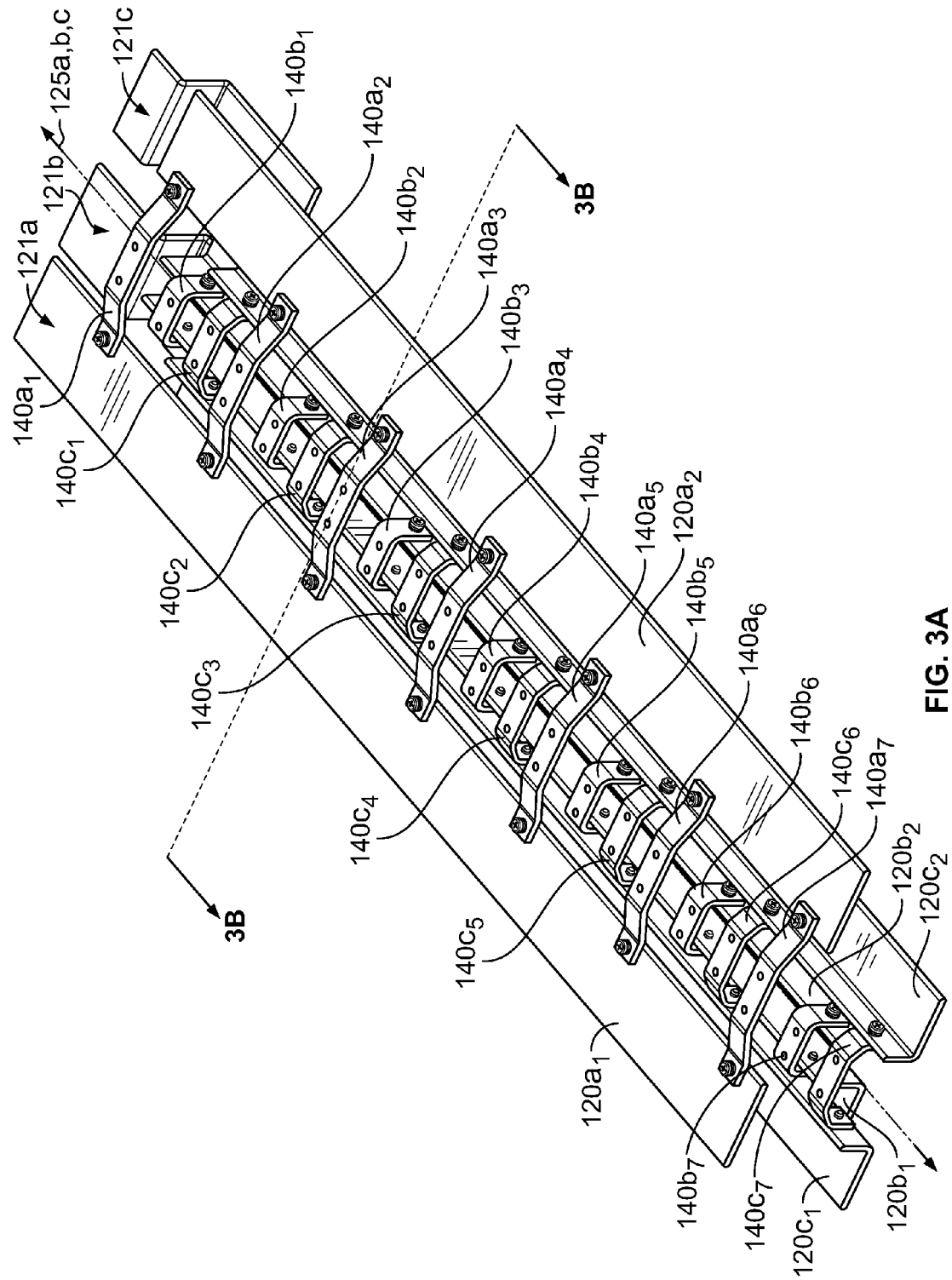
FIG. 3A is a perspective view of three pairs of generally parallel busbars and three sets of stabs from FIGS. 1 and 2 with a housing and all insulating layers removed according to some aspects of the present disclosure.

Referring to FIG. 2, a top view of the load center 100 is shown. As shown in FIG. 3A, the pairs of busbars 120 are formed from any electrically conducting material, as is known in the art, such as copper. The pairs of busbars 120 are positioned within the housing 110 such that each of the pairs of busbars 120 are electrically insulated from the housing 100 and from each other. The busbars 120 can be positioned between and held rigidly in place by a first block 112 and a second block 114. The first and the second blocks 112 and 114 are attached or coupled to the housing 110 and/or the insulating base 111 such that the first and the second blocks 112 and 114 aid in electrically insulating the pairs of busbars 120 from the housing 110. The first block 112 includes a first terminal 112a, a second terminal 112b, and a third terminal 112c. Each of the first, the second, and the third terminals 112a,b,c is configured to be electrically connected with a respective one of the pairs of busbars 120.

Referring to FIGS. 2 and 3A, a first pair of generally parallel busbars 120a is configured to be coupled with the first terminal 112a through a first attachment member 121a. The first attachment member 121a can be integral with, or attached to, one end of one or both of the first pair of generally parallel busbars 120a. Similarly, a second pair of generally parallel busbars 120b is configured to be coupled with the second terminal 112b through a second attachment member 121b. The second attachment member 121b can be integral with, or attached to, one end of one or both of the second pair of generally parallel busbars 120b. Similarly, a third pair of generally parallel busbars 120c is configured to be coupled with the third terminal 112c through a third attachment member 121c. The third attachment member 121c can be integral with, or attached to, one end of one or both of the third pair of generally parallel busbars 120c.

Referring specifically to FIG. 2, the housing 110 includes one or more apertures positioned adjacent to the terminals 112a,b,c and configured to receive electrical supply lines 119a,b,c. The first, the second, and the third terminals 112a,b,c include respective attachment means, such as, for example, a lug, screw, or bolt to aid in the electrical coupling and physical attachment of the electrical supply wires 119a,b,c. The electrical supply wires 119a,b,c are electrically and physically coupled with the respective terminals 112a,b,c via the screws or the like to supply distinct and separate phases of electricity to the first pair of busbars 120a, the second pair of busbars 120b, and the third pair of busbars 120c, respectively. For example, the first electrical supply wire 119a supplies a first phase of electricity to the first pair of generally parallel busbars 120a via the first terminal 112a; the second electrical supply wire 119b supplies a second phase of electricity to the second pair of generally parallel busbars 120b via the second terminal 112b; and the third electrical supply wire 119c supplies a third phase of electricity to the third pair of generally parallel busbars 120c via the third terminal 112c.

Referring specifically to FIG. 3A, the three pairs of generally parallel busbars 120a,b,c and corresponding set of stabs 140a,b,c are shown with the housing 110 removed and all insulating layers removed to illustrate a stacked and staggered configuration of the pairs of busbars 120a,b,c and the corresponding set of stabs 140a,b,c. That is, the first, the second, and the third pairs of generally parallel busbars $120a,b,c$ are stacked relative to each other such that at least a portion of each pair of busbars lies in a different vertical plane. Additionally, the first, the second, and the third pairs of generally parallel busbars $120a,b,c$ are staggered such that the first, the second, and the third pluralities of stabs $140a,b,c$, respectively, alternate along a coinciding central axis as described below.

The first pair of generally parallel busbars $120a$ is shown on the top of the stack. The first pair of busbars $120a$ includes a first busbar $120a_1$ that is parallel with and coplanar with a second busbar $120a_2$. The first busbar $120a_1$ and the second busbar $120a_2$ are shown as resembling flat sheets, although it is contemplated that, alternately, the first busbar $120a_1$ and/or the second busbar $120a_2$ can have an "L" configuration and/or a "C" configuration. The first busbar $120a_1$ and the second busbar $120a_2$ are physically and electrically connected by the first set of stabs $140a_{1-7}$. While FIG. 3A illustrates seven stabs $140a$, the first set of stabs $140a$ can include any number of stabs, such as, for example, 1, 3, 5, 7, 10, 100, etc., to accommodate a variety of different numbers of circuit breakers within the load center 100. While the first set of stabs $140a$ is shown as having an open trapezoidal shape, it is contemplated that each one of the first set of stabs $140a$ can have a "C" shape, a substantially flat sheet shape, or an "L" shape.

The second pair of generally parallel busbars $120b$ is shown on the bottom of the stack. The second pair of busbars $120b$ includes a first busbar $120b_1$ that is parallel with and at least partially coplanar with a second busbar $120b_2$. In other words, major corresponding surfaces $122b_1$, $122b_2$ (shown in FIG. 3B) of each of the second pair of busbars $120b$ share a common plane. The first busbar $120b_1$ and the second busbar $120b_2$ are shown as having an "L" configuration, although it is contemplated that in some alternative embodiments the first busbar $120b_1$ and/or the second busbar $120b_2$ can have a flat sheet configuration like the first pair of busbars $120a$ and/or a "C" configuration. The first busbar $120b_1$ and the second busbar $120b_2$ are physically and electrically connected by the second set of stabs $140b_{1-7}$. While FIG. 3A illustrates seven stabs in the second set of stabs $140b$ for connecting up to 14 circuit breakers, it is contemplated that the second set of stabs $140b$ can include any number of stabs that corresponds with the number of stabs in the first set of stabs $140a$, such as, for example, 1, 3, 5, 7, 10, 100, etc. While the second set of stabs $140b$ is shown as having a "C" shape, it is contemplated that each one of the second set of stabs $140b$ can have a trapezoidal shape, a substantially flat sheet shape, or an "L" shape.

The third pair of generally parallel busbars $120c$ is shown between the first and the second pairs of generally parallel busbars $120a,b$ in the stack. The third pair of busbars $120c$ includes a first busbar $120c_1$ that is parallel with and at least partially coplanar with a second busbar $120c_2$. In other words, major corresponding surfaces $122c_1$, $122c_2$ (shown in FIG. 3B) of each of the third pair of busbars $120c$ share a common plane. The first busbar $120c_1$ and the second busbar $120c_2$ are shown as having an "L" configuration, although it is contemplated that the first busbar $120c_1$ and/or the second busbar $120c_2$ can alternately have a flat sheet configuration like the first pair of busbars $120a$ and/or a "C" configuration. The first busbar $120c_1$ and the second busbar $120c_2$ are physically and electrically connected by the third set of stabs $140c_{1-7}$. While FIG. 3A illustrates seven stabs in the third set of stabs $140c$, it is contemplated that the third set of stabs $140c$ can include any number of stabs that corresponds with the number of stabs in the first set of stabs $140a$, such as, for example, 1, 3, 5, 7, 10, 100, etc. While the third set of stabs $140c$ is shown as having a "C" shape, it is contemplated that each one of the third set of stabs $140c$ can have a trapezoidal shape, a substantially flat sheet shape, or an "L" shape.

The first pair of generally parallel busbars $120a$ has a first central axis $125a$ that is located equidistantly between the first busbar $120a_1$ and the second busbar $120a_2$. Similarly, the second pair of generally parallel busbars $120b$ has a second central axis $125b$ that is located equidistantly between the first busbar $120b_1$ and the second busbar $120b_2$ and the third pair of generally parallel busbars $120c$ has a third central axis $125c$ that is located equidistantly between the first busbar $120c_1$ and the second busbar $120c_2$. According to some embodiments, the first central axis $125a$, the second central axis $125b$, and the third central axis $125c$, all coincide with each other or are one and the same. That is, the first central axis $125a$ coincides with the second central axis $125b$ and the third central axis $125c$.

Figure 3B:
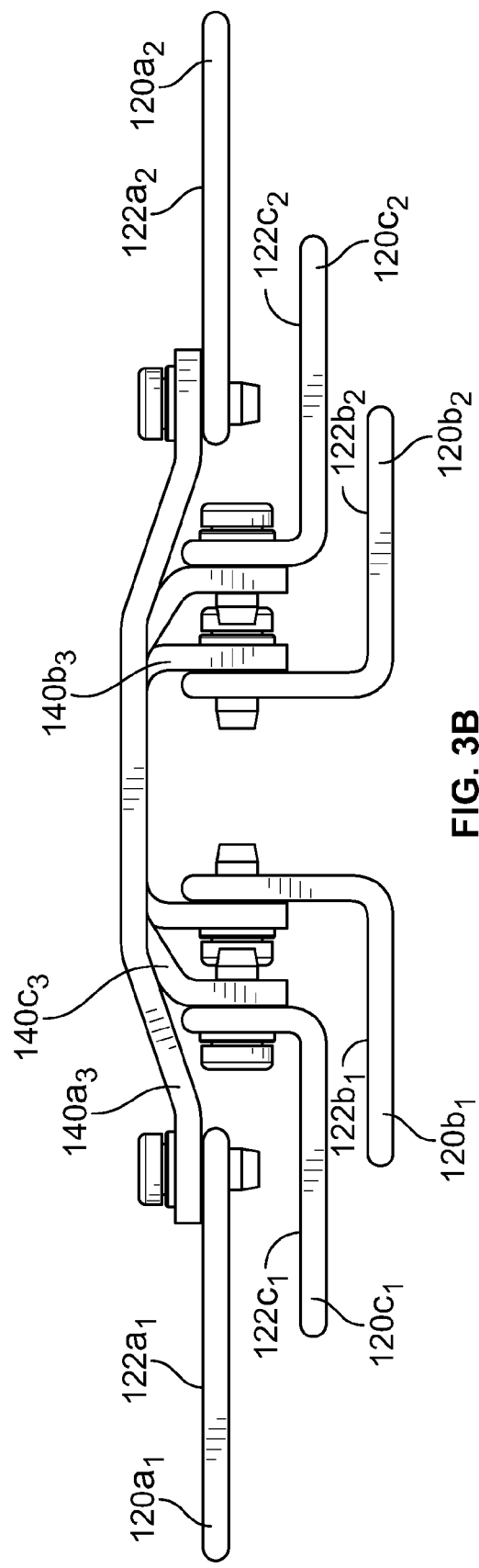
FIG. 3B is a cross-sectional front view of the three pairs of generally parallel busbars and the three sets of stabs from FIG. 3A.

Referring to FIG. 3B, a cross-sectional front view of the stacked and staggered configuration of busbar pairs $120a,b,c$ of FIG. 3A is shown. As shown in FIG. 3B, the first pair of busbars $120a$ is stacked above the third pair of busbars $120c$, both of which are stacked on top of the second pair of busbars $120b$. As described herein in reference to FIGS. 4A-G, each of the pairs of busbars $120a,b,c$ is separated and electrically insulated using insulating layers (not shown in FIG. 3B) that are sandwiched between the pairs of busbars $120a,b,c$.

Figure 4A:
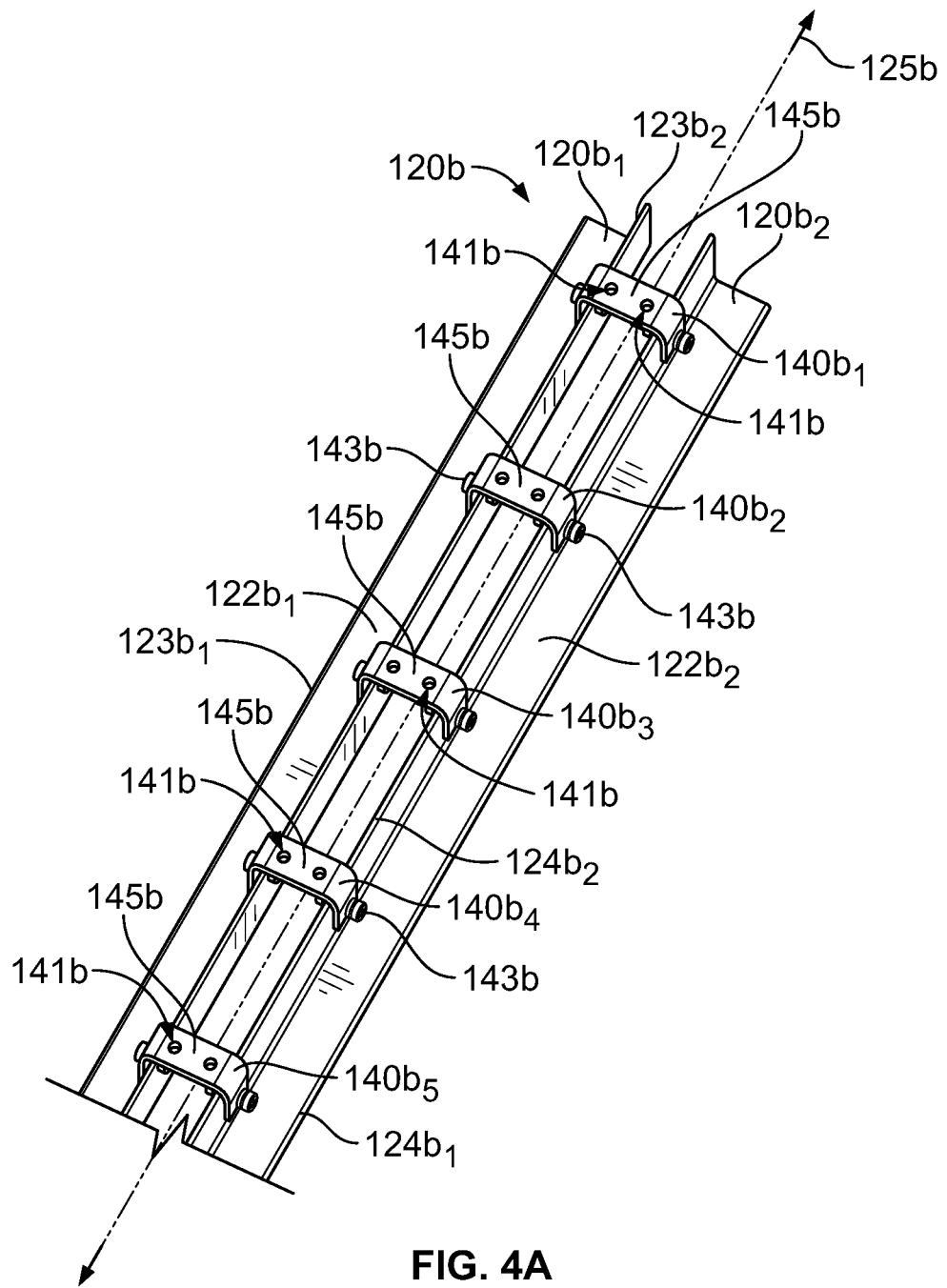
FIG. 4A is a partial perspective view of a first pair of generally parallel busbars and a first set of stabs according to some aspects of the present disclosure.

Referring generally to FIGS. 4A-4G, the pairs of busbars 120 and the sets of stabs 140 are described according to an implementation of the present disclosure. Referring specifically to FIG. 4A, a partial perspective view of the second pair of busbars $120b$ and the second set of stabs $140b$ is shown. The first busbar $120b_1$ of the second pair of generally parallel busbars $120b$ has a substantially flat major surface $122b_1$ and opposing edge surfaces $123b_1$, $123b_2$. Similarly, the second busbar $120b_2$ of the second pair of generally parallel busbars $120b$ has a substantially flat major surface $122b_2$ and opposing edge surfaces $124b_1$, $124b_2$.

The second pair of generally parallel busbars $120b$ is positioned within the housing 110 such that the substantially flat major surface $122b_1$ of the first busbar $120b_1$ is coplanar with the substantially flat major surface $122b_2$ of the second busbar $120b_2$. As described above, the second pair of generally parallel busbars $120b$ has a second central axis $125b$ that is located equidistantly between the first busbar $120b_1$ and the second busbar $120b_2$. Additionally, the opposing edge surfaces $123b_1$ and $123b_2$ of the first busbar $120b_1$ and the opposing edge surfaces $124b_1$ and $124b_2$ of the second busbar $120b_2$ are parallel with the second central axis $125b$.

The second set of stabs $140b$ is positioned along the second central axis $125b$ to physically and electrically connect the first busbar $120b_1$ with the second busbar $120b_2$. That is, each one of the second set of stabs $140b$ physically and electrically couples the first busbar $120b_1$ with the second busbar $120b_2$. As shown in FIG. 4A, each one of the second set of stabs $140b$, such as, for example, the second stab $140b_2$, is coupled with the first busbar $120b_1$ via a first screw $143b$ and the second busbar $120b_2$ via a second screw $143b$. It is contemplated that each of the second set of stabs $140b$ can be coupled with the first and/or the second busbars $120b_1$, $120b_2$, via screw(s), nuts and bolts, welds, snap-fit connection, or a combination thereof.

Each of the second set of stabs $140b$ has a circuit breaker connecting surface $145b$ that is configured to be coupled with corresponding electrical connectors (not shown) of two separate and distinct circuit breakers. As shown, each of the second set of stabs $140b$ includes two apertures $141b$. Each of the apertures $141b$ is configured to receive a screw, bolt, or the like to physically and/or electrically couple a circuit breaker, as shown in, for example, FIG. 4G, with the second pair of busbars $120b$. The circuit breaker connecting surfaces $145b$ of each one of the second set of stabs $140b$ are coplanar with one another. That is, for example, the circuit breaker connecting surface $145b$ of the first stab $140b_1$ is coplanar with the circuit breaker connecting surface $145b$ of the second stab $140b_2$, the third stab $140b_3$, the fourth stab $140b_4$, the fifth stab $140b_5$, etc. The coplanar circuit breaker connecting surfaces $145b$ of the second set of stabs $140b$ provide a uniform platform for coupling circuit breakers. As will be explained below, the first and the third sets of stabs $140a,c$ also include circuit breaker connecting surfaces $145a,c$ that are coplanar with the circuit breaker connecting surfaces $145b$ of the second set of stabs $140b$ such that multiphase circuit breakers, such as, for example, the circuit breakers $180$, shown in FIG. 1, can be physically and electrically connected with the first, the second, and the third phases of electricity entering the load center $100$.

As described above, each of the second set of stabs $140b$ forms a bridge between the first busbar $120b_1$ and the second busbar $120b_2$ to (1) physically and electrically connect the first busbar $120b_1$ and the second busbar $120b_2$ and (2) provide a circuit breaker connecting surface $145b$ that is configured to be coupled with corresponding electrical connectors of two separate and distinct circuit breakers. In addition, each of the second set of stabs $140b$ forms a bridge between the first busbar $120b_1$ and the second busbar $120b_2$ to (3) provide a bidirectional path for dissipating heat generated by electrical current conducted between the busbars and the attached circuit breakers from each one of the second set of stabs $140b$ to the first busbar $120b_1$ and to the second busbar $120b_2$.

For example, as shown in FIG. 1, circuit breakers $180$ can be connected with one or more of the second set of stabs $140b$. During operation of the load center $100$ in, for example, a residential house, electrical current passes through the circuit breakers $180$, which creates heat in the circuit breakers $180$. Heat is dissipated from the circuit breakers $180$ to the second pair of busbars $120b$ in a bidirectional manner via the second set of stabs $140b$. That is, heat can travel from each one of the second set of stabs $140b$ in one of two directions as each one of the second set of stabs $140b$ is physically and electrically connected to the first busbar $120b_1$ and to the second busbar $120b_2$. In other words, heat can travel from, for example, the second stab $140b_2$ in a first direction to the first busbar $120b_1$ or in a second direction to the second busbar $120b_2$.

Figure 4B:
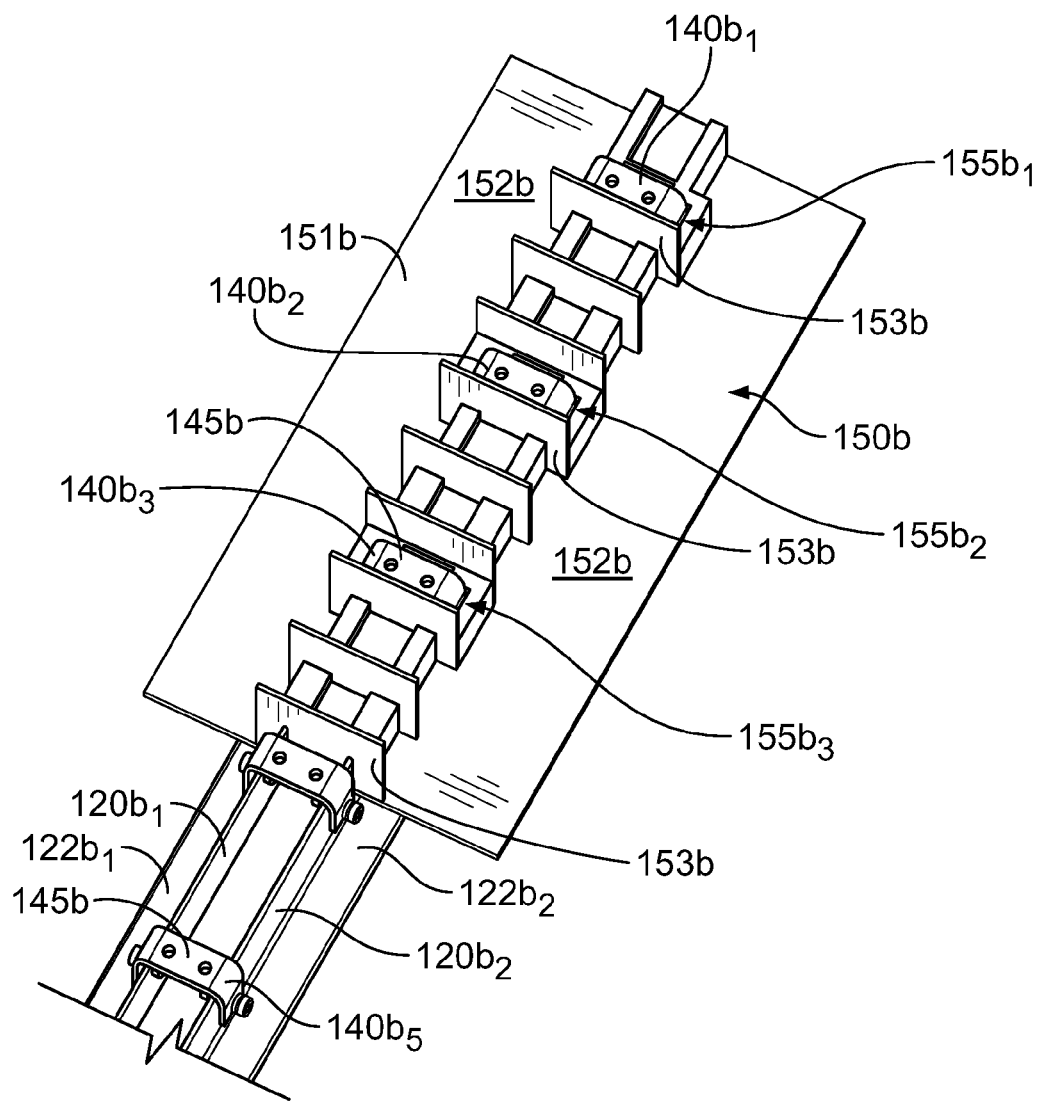
FIG. 4B is the partial perspective view of FIG. 4A having a first insulating layer overlaid thereon according to some aspects of the present disclosure.

Now referring to FIG. 4B, the second pair of generally parallel busbars $120b$ and the second set of stabs $140b$ of FIG. 4A are shown having a second insulating layer $150b$ overlaid thereon. Only a portion of the second insulating layer $150b$ is shown to illustrate how the second pair of busbars $120b$ extends beneath the second insulating layer $150b$. The second insulating layer $150b$ can be a single part or multiple parts. For example, the second insulating layer $150b$ can be broken into sections that electrically insulate respective portions of the second pair of busbars $120b$. It is contemplated that the second insulating layer $150b$ is made of any electrically insulating material, such as, for example, plastic, rubber, etc.

The second insulating layer $150b$ includes an insulator base $151b$, phase barriers $153b$, and apertures $155b$. Each of the phase barriers $153b$ extends perpendicularly from the insulator base $151b$ to aid in electrically insulating the second phase of electricity entering the load center $100$ through the second electrical supply line $119b$ from the first phase of electricity entering the load center $100$ through the first electrical supply line $119a$ and from the third phase of electricity entering the load center $100$ through the third electrical supply line $119c$. The phase barriers $153b$ are configured to be received between circuit breakers and/or within respective slots in a multiphase circuit breaker, such as, for example, as shown in FIG. 1.

Each of the apertures $155b$ is positioned to allow access to a respective underlying stab. For example, the first aperture $155b_1$ is positioned to provide access to the first stab $140b_1$ of the second set of stabs $140b$. Similarly, the second aperture $155b_2$ is positioned to provide access to the second stab $140b_2$, and the third aperture $155b_3$ is positioned to provide access to the third stab $140b_3$. That is, the apertures $155b$ provide a path for circuit breakers to physically and/or electrically couple with one of the underlying stabs, such as, for example, one of the second set of stabs $140b$.

The insulator base $151b$ forms a substantially flat major surface $152b$ that at least partially rests on the substantially flat major surface $122b_1$ of the first busbar $120b_1$ of the second pair of busbars $120b$ and on the substantially flat major surface $122b_2$ of the second busbar $120b_2$ of the second pair of busbars $120b$, which provides a portion of the stacked and staggered configuration of busbars and stabs described herein.

Figure 4C:
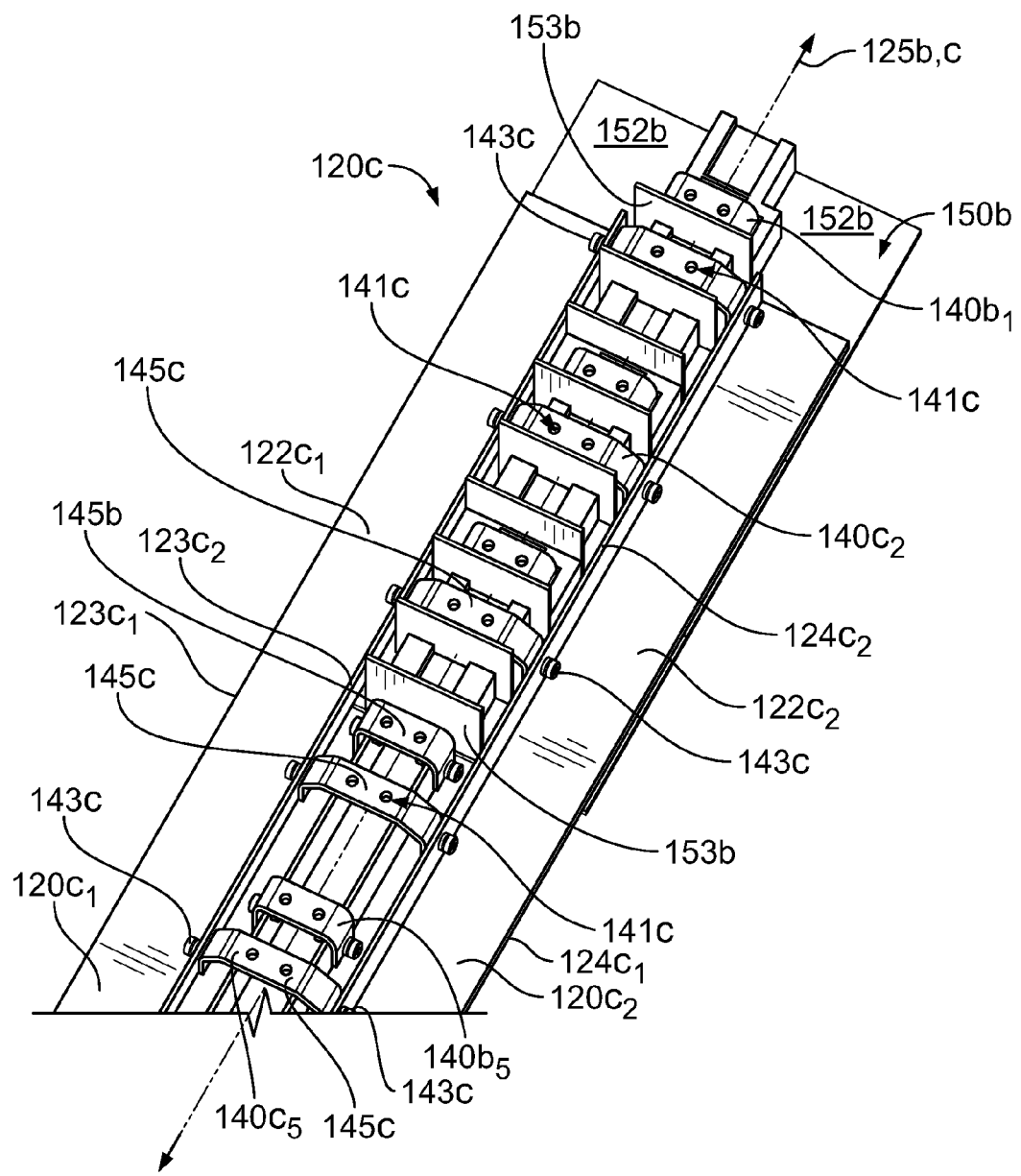
FIG. 4C is the partial perspective view of FIG. 4B having a second pair of generally parallel busbars and a second set of stabs overlaid thereon according to some aspects of the present disclosure.

Referring specifically to FIG. 4C, the second pair of generally parallel busbars $120b$, the second set of stabs $140b$, and the second insulating layer $150b$ of FIG. 4B are shown having the third pair of generally parallel busbars $120c$ and the third set of stabs $140c$ overlaid thereon. The first busbar $120c_1$ of the third pair of generally parallel busbars $120c$ has a substantially flat major surface $122c_1$ and opposing edge surfaces $123c_1$, $123c_2$. Similarly, the second busbar $120c_2$ of the third pair of generally parallel busbars $120c$ has a substantially flat major surface $122c_2$ and opposing edge surfaces $124c_1$, $124c_2$.

The third pair of generally parallel busbars $120c$ is positioned within the housing $110$ in the stacked and staggered configuration such that the substantially flat major surface $152b$ of the insulator base $151b$ is sandwiched between the substantially flat major surfaces $122b_1$ and $122b_2$ of the second pair of generally parallel busbars $120b$ and the substantially flat major surfaces $122c_1$ and $122c_2$ of the third pair of generally parallel busbars $120c$. Additionally, the third pair of generally parallel busbars $120c$ is positioned within the housing $110$ such that the substantially flat major surface $122c_1$ of the first busbar $120c_1$ is coplanar with the substantially flat major surface $122c_2$ of the second busbar $120c_2$. As described above, the third pair of generally parallel busbars $120c$ has a third central axis $125c$ that is located equidistantly between the first busbar $120c_1$ and the second busbar $120c_2$. Additionally, according to some embodiments, the opposing edge surfaces $123c_1$ and $123c_2$ of the first busbar $120c_1$ and the opposing edge surfaces $124c_1$ and $124c_2$ of the second busbar $120c_2$ are parallel with the third central axis $125c$.

The third set of stabs $140c$ is positioned along the third central axis $125c$ to physically and electrically connect the first busbar $120c_1$ with the second busbar $120c_2$. That is, each one of the third set of stabs $140c$ physically and electrically couples the first busbar $120c_1$ with the second busbar $120c_2$. As shown in FIG. 4C, each one of the third set of stabs $140c$, such as, for example, the fifth stab $140c_5$, is coupled with the first busbar $120c_1$ via a first screw $143c$ and the second busbar $120c_2$ via a second screw $143c$. It is contemplated that each of the third set of stabs $140c$ can be coupled with the first and/or the second busbars $120c_1$, $120c_2$, via screw(s), nuts and bolts, welds, snap-fit connection, or a combination thereof.

Each of the third set of stabs $140c$ has a circuit breaker connecting surface $145c$ that is configured to be coupled with corresponding electrical connectors of two separate and distinct circuit breakers. As shown, each of the third set of stabs 140c includes two apertures 141c. Each of the apertures 141c is configured to receive a screw, bolt, or the like to physically and/or electrically couple a circuit breaker, as shown in, for example, FIG. 4G, with the third pair of busbars 120c. The circuit breaker connecting surfaces 145c of each one of the third set of stabs 140c are coplanar. That is, for example, the circuit breaker connecting surface 145c of the first stab 140$c_1$ is coplanar with the circuit breaker connecting surface 145c of the second stab 140$c_2$, the third stab 140$c_3$, the fourth stab 140$c_4$, the fifth stab 140$c_5$, etc. The coplanar circuit breaker connecting surfaces 145c of the third set of stabs 140c provide a uniform platform for coupling circuit breakers as described above in reference to FIG. 4A.

As described above, each of the third set of stabs 140c forms a bridge between the first busbar 120$c_1$ and the second busbar 120$c_2$ to (1) physically and electrically connect the first busbar 120$c_1$ and the second busbar 120$c_2$ and (2) provide a circuit breaker connecting surface 145c that is configured to be coupled with corresponding electrical connectors of two separate and distinct circuit breakers. In addition, each of the third set of stabs 140c forms a bridge between the first busbar 120$c_1$ and the second busbar 120$c_2$ to (3) provide a bidirectional path for dissipating heat from each one of the third set of stabs 140c to the first busbar 120$c_1$ and the second busbar 120$c_2$, in the same, or similar, manner as described above in reference to the second set of stabs and FIG. 4A.

As described above, the third set of stabs 140c is positioned along the third central axis 125c, which coincides with the second central axis, such that the third set of stabs 140c is staggered with respect to the second set of stabs 140b. That is, the second set of stabs 140b and the third set of stabs 140c are staggered such that respective portions of the second set of stabs 140b and respective portions of the third set of stabs 140c alternate along the second central axis and the third central axis. The respective portions are respective circuit breaker connection surfaces 145b,c of the second and the third sets of stabs 140b,c.

Figure 4D:
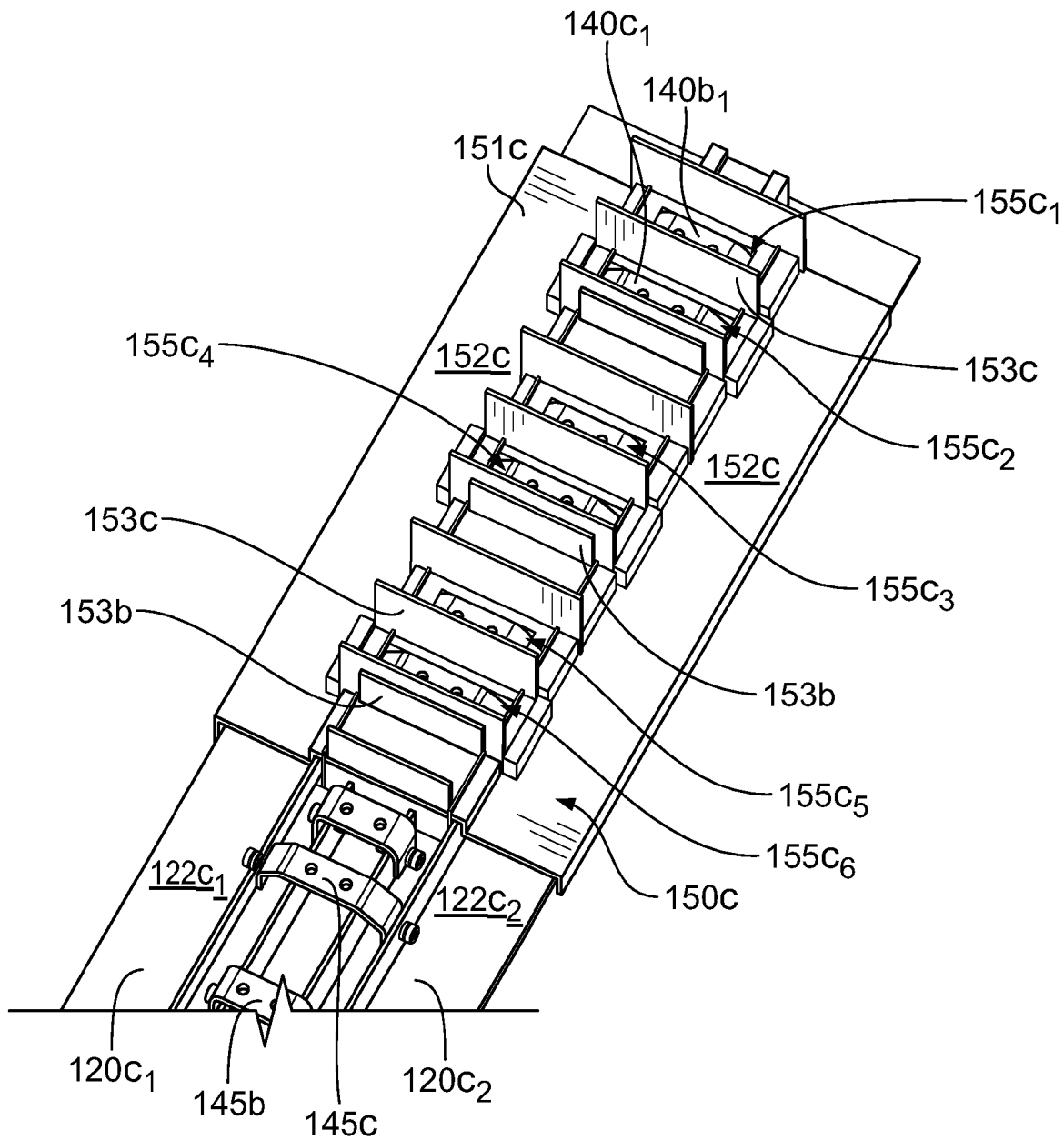
FIG. 4D is the partial perspective view of FIG. 4C having a second insulating layer overlaid thereon according to some aspects of the present disclosure.

Now referring to FIG. 4D, the third pair of generally parallel busbars 120c, the third set of stabs 140c, the second insulating layer 150b, the second pair of generally parallel busbars 120b, and the second set of stabs 140b of FIG. 4C are shown having a third insulating layer 150c overlaid thereon. The third insulating layer 150c is the same as, or similar to, the second insulating layer 150b in that, the third insulating layer 150c can be a single part or multiple parts. It is contemplated that the third insulating layer 150c is made of any electrically insulating material, such as, for example, plastic, rubber, etc.

The third insulating layer 150c includes an insulator base 151c, phase barriers 153c, and apertures 155c. Each of the phase barriers 153c extends perpendicularly from the insulator base 151c to aid in electrically insulating the second phase of electricity entering the load center 100 through the second electrical supply line 119b from the first phase of electricity entering the load center 100 through the first electrical supply line 119a and from the third phase of electricity entering the load center 100 through the third electrical supply line 119c in the same or similar manner as described above in reference to the phase barriers 153b and FIG. 4B. Alternately, the third insulating layer 150c does not include phase barriers, and the phase barriers 153b of the second insluting layer 150b provide sufficient electrical insulation between phases.

Each of the apertures 155c is positioned to allow access to a respective underlying stab. For example, the first aperture 155$c_1$ is positioned to provide access to the first stab 140$b_1$ of the second set of stabs 140b. Similarly, the second aperture 155$c_2$ is positioned to provide access to the first stab 140$c_1$ of the third set of stabs 140c. That is, the apertures 155c provide a path for circuit breakers to physically and/or electrically couple with one of the underlying stabs, such as, for example, one of the second and/or the third sets of stabs 140b,c.

The insulator base 151c forms a substantially flat major surface 152c that at least partially rests on the substantially flat major surface 122$c_1$ of the first busbar 120$c_1$ of the third pair of busbars 120c and on the substantially flat major surface 122$c_2$ of the second busbar 120$c_2$ of the third pair of busbars 120c, which provides a portion of the stacked and staggered configuration of busbars and stabs described herein.

Figure 4E:
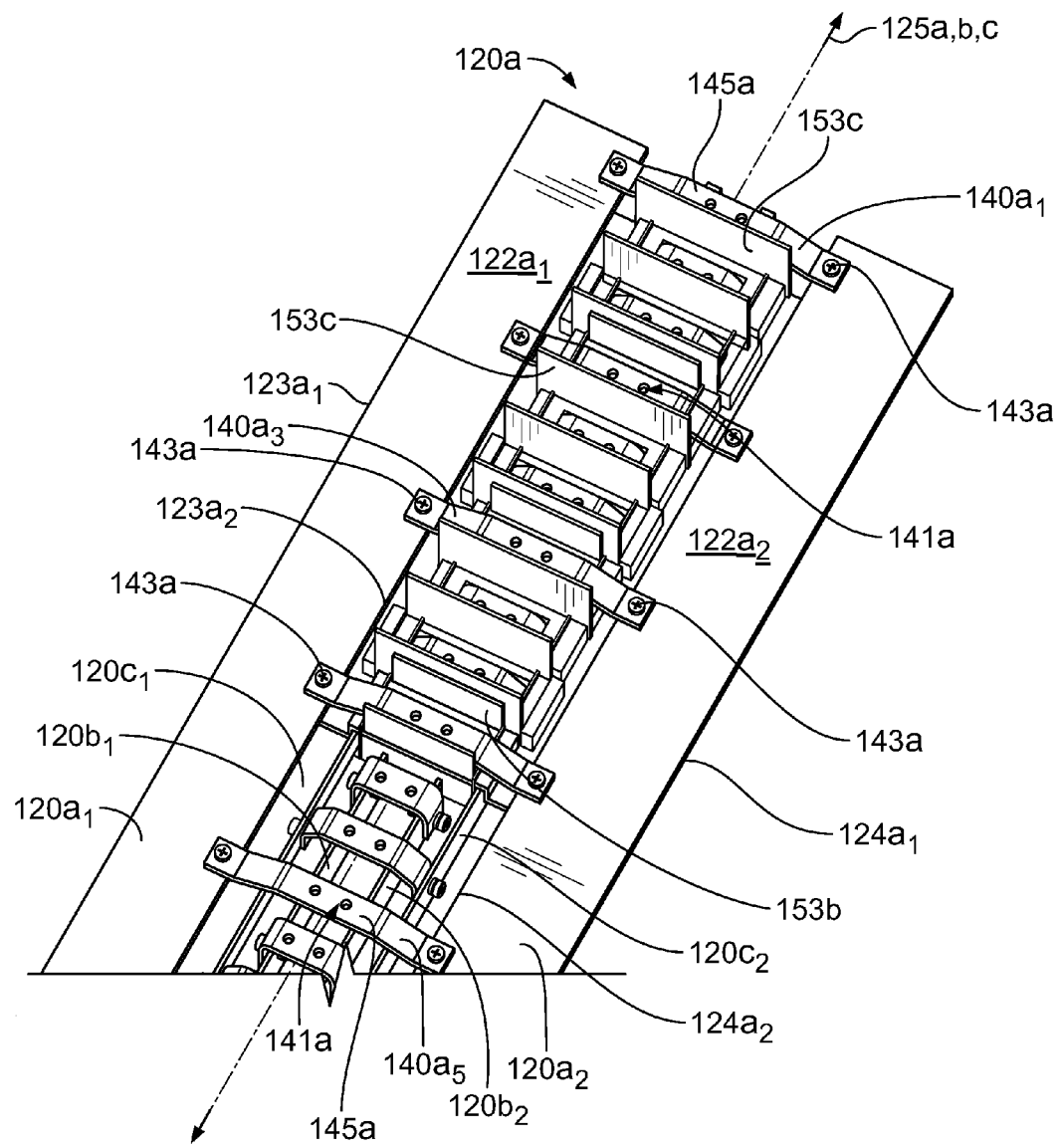
FIG. 4E is the partial perspective view of FIG. 4D having a third pair of generally parallel busbars and a third set of stabs overlaid thereon according to some aspects of the present disclosure.

Referring specifically to FIG. 4E, the third insulating layer 150c, the third pair of generally parallel busbars 120c, the third set of stabs 140c, the second insulating layer 150b, the second pair of generally parallel busbars 120b, and the second set of stabs 140b of FIG. 4D are shown having the first pair of generally parallel busbars 120a and the first set of stabs 140a overlaid thereon. The first busbar 120$a_1$ of the first pair of generally parallel busbars 120a has a substantially flat major surface 122$a_1$ and opposing edge surfaces 123$a_1$, 123$a_2$. Similarly, the second busbar 120$a_2$ of the first pair of generally parallel busbars 120a has a substantially flat major surface 122$a_2$ and opposing edge surfaces 124$a_1$, 124$a_2$.

The first pair of generally parallel busbars 120a is positioned within the housing 110 in the stacked and staggered configuration such that the substantially flat major surface 152c of the insulator base 151c is sandwiched between the substantially flat major surfaces 122$c_1$ and 122$c_2$ of the third pair of generally parallel busbars 120c and the substantially flat major surfaces 122$a_1$ and 122$a_2$ of the first pair of generally parallel busbars 120a. Additionally, the first pair of generally parallel busbars 120a is positioned within the housing 110 such that the substantially flat major surface 122$a_1$ of the first busbar 120$a_1$ is coplanar with the substantially flat major surface 122$a_2$ of the second busbar 120$a_2$. As described above, the first pair of generally parallel busbars 120a has a first central axis 125a that is located equidistantly between the first busbar 120$a_1$ and the second busbar 120$a_2$. Additionally, the opposing edge surfaces 123$a_1$ and 123$a_2$ of the first busbar 120$a_1$ and the opposing edge surfaces 124$a_1$ and 124$a_2$ of the second busbar 120$a_2$ are parallel with the first central axis 125a.

The first set of stabs 140a is positioned along the first central axis 125a to physically and electrically connect the first busbar 120$a_1$ with the second busbar 120$a_2$. That is, each one of the first set of stabs 140a physically and electrically couples the first busbar 120$a_1$ with the second busbar 120$a_2$. As shown in FIG. 4E, each one of the first set of stabs 140a, such as, for example, the third stab 140$a_3$, is coupled with the first busbar 120$a_1$ via a first screw 143a and the second busbar 120$a_2$ via a second screw 143a. It is contemplated that each of the first set of stabs 140a can be coupled with the first and/or the second busbars 120$a_1$, 120$a_2$, via screw(s), nuts and bolts, welds, snap-fit connection, or a combination thereof.

Each of the first set of stabs 140a has a circuit breaker connecting surface 145a that is configured to be coupled with corresponding electrical connectors of two separate and distinct circuit breakers. As shown, each of the first set of stabs 140a includes two apertures 141a. Each of the apertures 141a is configured to receive a screw, bolt, or the like to physically and/or electrically couple a circuit breaker, as shown in, for example, FIG. 4G, with the first pair of busbars 120a. The circuit breaker connecting surfaces 145a of each one of the first set of stabs 140a are coplanar. That is, for example, the circuit breaker connecting surface 145a of the first stab 140$a_1$ is coplanar with the circuit breaker connecting surface 145*a* of the second stab 140*a*$_2$, the third stab 140*a*$_3$, the fourth stab 140*a*$_4$, the fifth stab 140*a*$_5$, etc. The coplanar circuit breaker connecting surfaces 145*a* of the first set of stabs 140*a* provide a uniform platform for coupling circuit breakers as described above in reference to FIG. 4A.

As described above, each of the first set of stabs 140*a* forms a bridge between the first busbar 120*a*$_1$ and the second busbar 120*a*$_2$ to (1) physically and electrically connect the first busbar 120*a*$_1$ and the second busbar 120*a*$_2$ and (2) provide a circuit breaker connecting surface 145*a* that is configured to be coupled with corresponding electrical connectors of two separate and distinct circuit breakers. In addition, each of the first set of stabs 140*a* forms a bridge between the first busbar 120*a*$_1$ and the second busbar 120*a*$_2$ to (3) provide a bidirectional path for dissipating heat from each one of the first set of stabs 140*a* to the first busbar 120*a*$_1$ and the second busbar 120*a*$_2$, in the same, or similar manner as described herein in reference to the second set of stabs and FIG. 4A.

As described above, the first set of stabs 140*a* is positioned along the first central axis 125*a*, which coincides with the second, and the third central axes, such that the first set of stabs 140*a* are staggered with respect to the second set of stabs 140*b* and with respect to the third set of stabs 140*c*. That is, the first set of stabs 140*a*, the second set of stabs 140*b*, and the third set of stabs 140*c* are staggered such that respective portions of the first set of stabs 140*a*, respective portions of the second set of stabs 140*b*, and respective portions of the third set of stabs 140*c* alternate along the first, the second, and the third central axes.

Figure 4F:
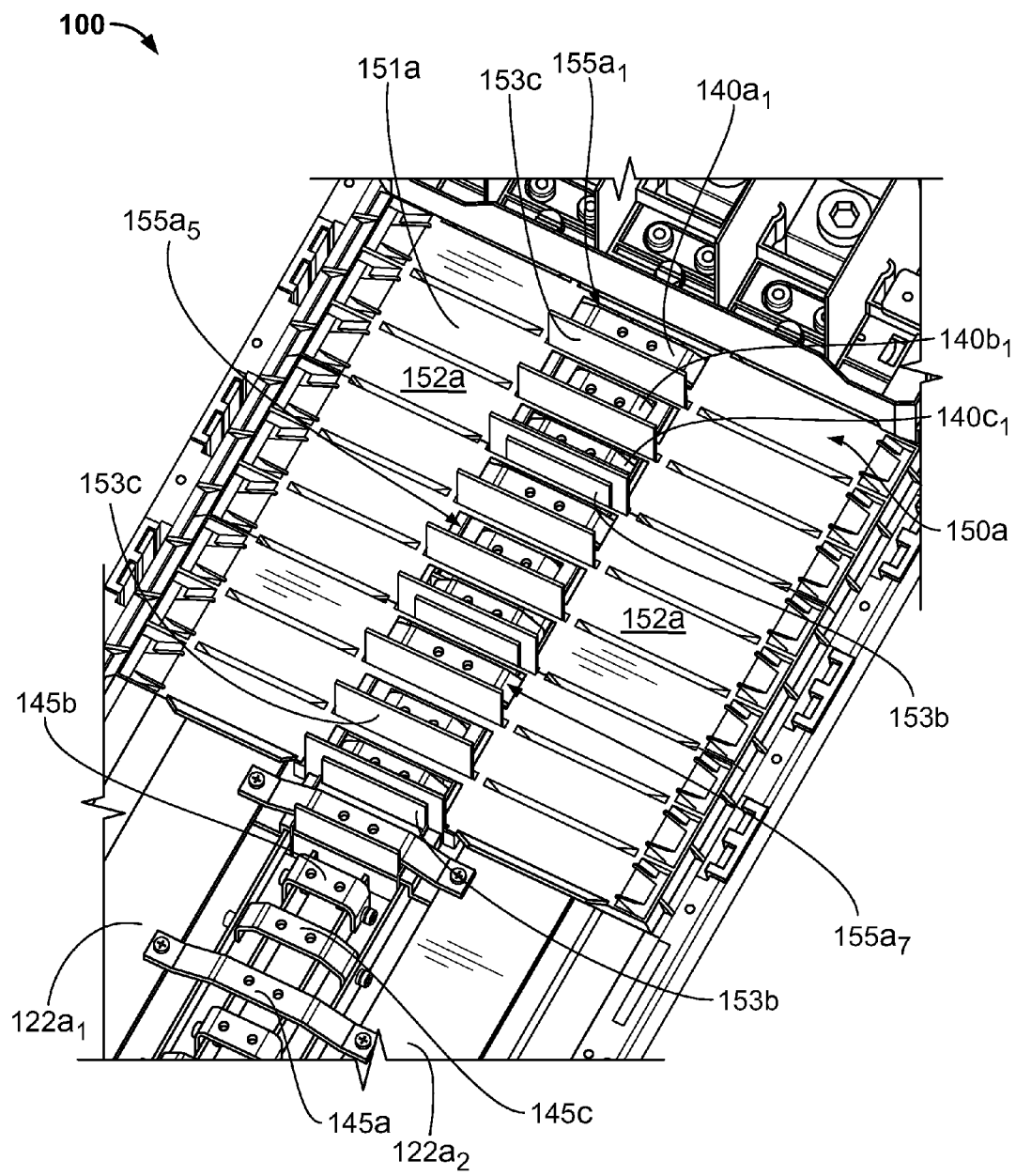
FIG. 4F is a partial perspective view a load center including the components of FIGS. 4A-4E having a third insulating layer overlaid thereon according to some aspects of the present disclosure.

Now referring to FIG. 4F, a partial perspective view of the load center 100 is shown. The load center 100 is shown as having the first pair of generally parallel busbars 120*a*, the first set of stabs 140*a*, the third insulating layer 150*c*, the third pair of generally parallel busbars 120*c*, the third set of stabs 140*c*, the second insulating layer 150*b*, the second pair of generally parallel busbars 120*b*, and the second set of stabs 140*b* of FIG. 4E with a first insulating layer 150*a* overlaid thereon. The first insulating layer 150*a* is similar to the second insulating layer 150*b* and the third insulating layer 150*c* in that, the first insulating layer 150*a* can be a single part or multiple parts. It is contemplated that the first insulating layer 150*a* is made of any electrically insulating material, such as, for example, plastic, rubber, etc.

The first insulating layer 150*a* includes an insulator base 151*a* and apertures 155*a*. Each of the apertures 155*a* is positioned to allow access to a respective underlying stab. For example, the first aperture 155*a*$_1$ is positioned to provide access to the first stab 140*a*$_1$ of the first set of stabs 140*a*. Similarly, the second aperture 155*a*$_2$ is positioned to provide access to the first stab 140*b*$_1$ of the second set of stabs 140*b* and the third aperture 155*a*$_3$ is positioned to provide access to the first stab 140*c*$_1$ of the third set of stabs 140*c*. That is, the apertures 155*a* provide a path for circuit breakers to physically and/or electrically couple with one of the underlying stabs, such as, for example, one of the first, the second, and/or the third sets of stabs 140*a,b,c*. According to some alternative embodiments, the stabs protrude through the apertures 155*a*.

The first insulating layer 150*a* does not include phase barriers. The phase barriers 153*b*, 153*c* of the second and the third insulating layers 150*b,c* protrude through the apertures 155*a*. The first insulating layer 150*a* can further include phase barriers the same as, or similar to, the phase barriers 153*b*, 153*c* described in reference to FIGS. 4B and 4D.

The insulator base 151*a* forms a substantially flat major surface 152*a* that at least partially rests on the substantially flat major surface 122*a*$_1$ of the first busbar 120*a*$_1$ of the first set of busbars 120*a* and on the substantially flat major surface 122*a*$_2$ of the second busbar 120*a*$_2$ of the first set of busbars 120*a*, which provides a portion of the stacked and staggered configuration of busbars and stabs described herein.

Figure 4G:
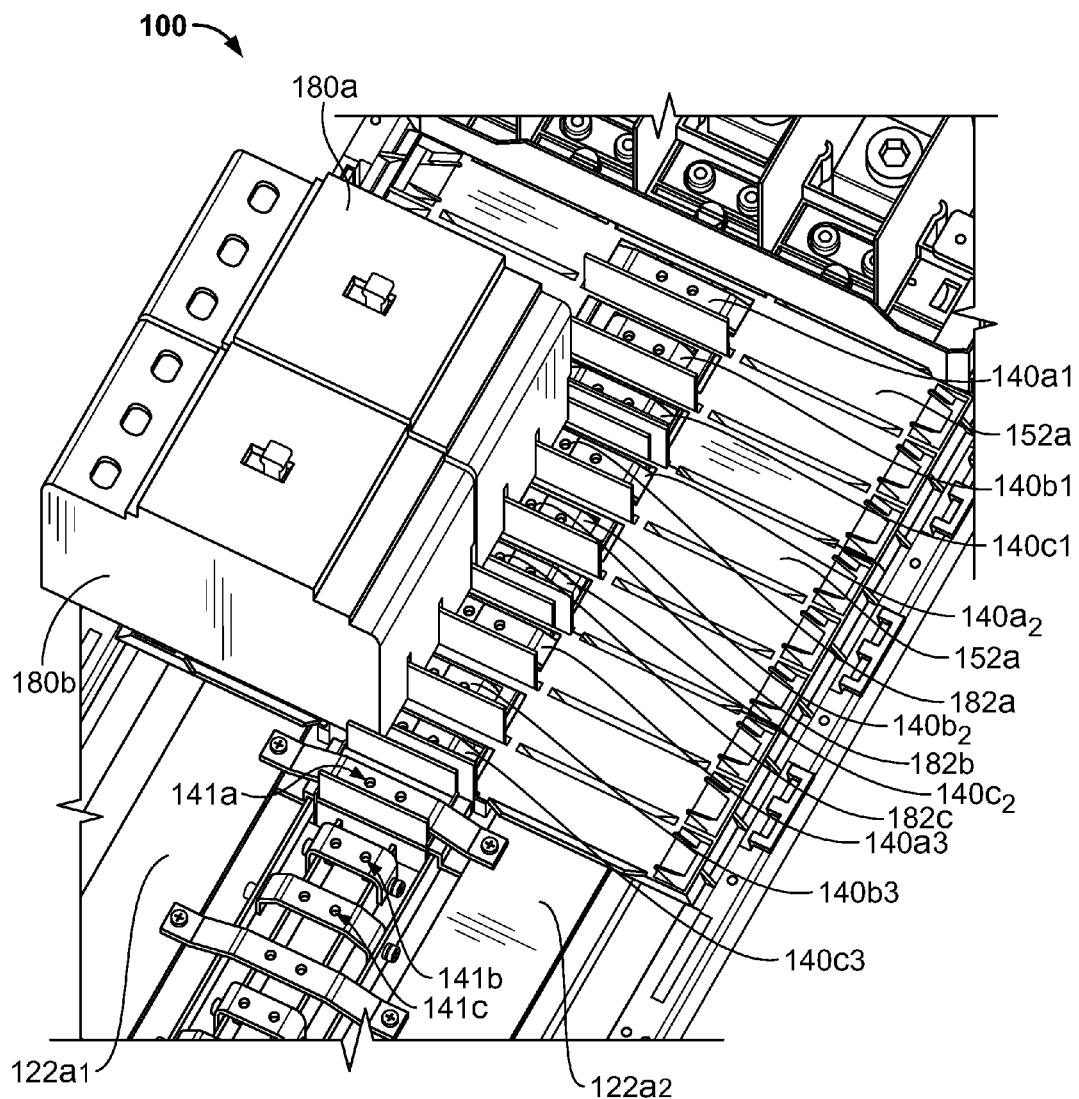
FIG. 4G is a partial perspective view of the load center of FIG. 4F having two multiphase circuit breakers coupled thereto.

Now referring to FIG. 4G, the partial perspective view of the load center 100 of FIG. 4F is shown having two multiphase circuit breakers 180*a,b* coupled thereto. Each of the circuit breakers 180*a,b* includes a first electrical connector 182*a*, a second electrical connector 182*b*, and a third electrical connector 182*c*. The electrical connectors 182*a,b,c* of each circuit breaker 180*a,b* correspond with respective stabs for receiving respective phases of electricity. For example, the first electrical connector 182*a* of the first circuit breakers 180*a* corresponds with the second stab 140*a*$_2$ of the first set of stabs 140*a* to receive the first phase of electricity; the second electrical connector 182*b* of the first circuit breakers 180*a* corresponds with the second stab 140*b*$_2$ of the second set of stabs 140*b* to receive the second phase of electricity; and the third electrical connector 182*c* of the first circuit breakers 180*a* corresponds with the second stab 140*c*$_2$ of the third set of stabs 140*c* to receive the third phase of electricity. The first, the second, and the third electrical connectors 182*a,b,c* are positioned to be fixedly connected with the corresponding stabs via, for example, a screw.

The first, the second, and the third electrical connectors 182*a,b,c* can be configured to snap-on corresponding stabs such that each of the first, the second, and the third electrical connectors 182*a,b,c* is physically and electrically connected to a respective stab.

It is contemplated that bidirectional heat dissipation, as described herein, allows for a reduction in a size or thickness of the pairs of busbars 120 as compared with prior art load centers that have stabs with unidirectional heat dissipation that are physically and/or electrically coupled with only one busbar for each phase of electricity being distributed in the load center. A reduction in a thickness of the busbars results in a reduction of copper needed to produce a load center, such as the load center 100. It is contemplated that bidirectional heat dissipation, as described herein, also provides load centers that have an increased efficiency as compared with prior art load centers that have stabs with unidirectional heat dissipation that are physically and/or electrically coupled with only one busbar for each phase of electricity being distributed in the load center.

A load center having bidirectional heat dissipation, as described herein, can be made with 20 percent to 35 percent less copper compared to prior art load centers that have stabs with unidirectional heat dissipation that are physically and/or electrically coupled with only one busbar for each phase of electricity being distributed in a load center. A load center having bidirectional heat dissipation, as described herein, can be made with 25 percent to 30 percent less copper compared to prior art load centers that have stabs with unidirectional heat dissipation that are physically and/or electrically coupled with only one busbar for each phase of electricity being distributed in a load center.

For example, a three-phase, low-amperage (e.g., 250 Amps) prior art load center having three busbars that are each 0.187 inches thick by 1.5 inches wide and fifteen stabs that are 0.187 inches thick by 0.5 inches wide, requires a total of about 2.69 kilograms of copper to produce such a load center. However, a three-phase, low-amperage (e.g., 250 Amps) load center according to aspects of the present disclosure having three pairs of busbars, where each one of the busbars in each pair of busbars is 0.062 inches thick by 1.5 inches wide and fifteen stabs that are 0.125 inches thick by 0.5 inches wide, requires a total of about 1.97 kilograms of copper to produce such a load center. That is, a three-phase, low-amperage (e.g., 250 Amps) load center according to aspects of the present disclosure can be produced with about 0.72 kilograms (26.7%) less of copper than a comparable prior art load center have the same circuit breaker capacity.

A load center according to the aspects of the present disclosure having bidirectional heat dissipation, as described herein, can be made with less copper and be more efficient (e.g., lose less heat) compared to prior art load centers that have stabs with unidirectional heat dissipation that are physically and/or electrically coupled with only one busbar for each phase of electricity being distributed in a load center.

Instead of including the apertures 141a,b,c, each one of the first, the second, and the third sets of stabs 140a,b,c can be configured to physically and electrically connect with one or more circuit breakers via a weld connection or a snap-fit connection. For a snap-fit connection, the circuit breakers include one or more jaw members configured to clamp or snap onto a portion of the circuit breaker connecting surface 145a,b,c.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A load center, comprising:
   a housing;
   a first busbar, positioned within the housing, for distributing a first phase of electricity entering the load center;
   a second busbar, positioned within the housing and physically separated from the first busbar, for distributing the first phase of electricity, the second busbar being generally parallel to the first busbar and electrically connected thereto; and
   a plurality of stabs, each of the plurality of stabs being electrically connected to the first busbar and the second busbar and each of the plurality of stabs being configured to physically and electrically connect with two circuit breakers within the load center.

2. The load center of claim 1, wherein the first and the second busbars distribute the same phase of electricity within the load center to a plurality of circuit breakers electrically connected to the first and the second busbars through the plurality of stabs.

3. The load center of claim 1, wherein the plurality of stabs are attached to the first and the second busbars via a screw, nuts and bolts, welds, snap-fit connection, or a combination thereof.

4. The load center of claim 1, wherein the first busbar and the second busbar each has a substantially flat major surface and two opposing edge surfaces, the first busbar and the second busbar being positioned within the housing such that (i) the two opposing edge surfaces of the first busbar are parallel with the two opposing edge surfaces of the second busbar and (ii) the substantially flat major surface of the first busbar is coplanar with the substantially flat major surface of the second busbar.

5. The load center of claim 4, wherein each of the plurality of stabs forms a bridge between the first busbar and the second busbar to provide a bidirectional path for dissipating heat from each one of the plurality of stabs to the first busbar and to the second busbar.

6. The load center of claim 1, wherein each of the plurality of stabs includes two apertures for physically coupling with corresponding electrical connectors of two separate and distinct circuit breakers.

7. The load center of claim 1, wherein each of the plurality of stabs is configured to be coupled with corresponding electrical jaw connectors of two separate and distinct circuit breakers.

8. A load center, comprising:
   a housing;
   a first pair of generally parallel busbars, positioned within the housing, for distributing a first phase of electricity, each of the first pair of busbars being physically separated from each other;
   a first plurality of stabs physically and electrically connected between the first pair of busbars;
   a second pair of generally parallel busbars, positioned within the housing, for distributing a second phase of electricity, each of the second pair of busbars being physically separated from each other;
   a second plurality of stabs physically and electrically connected between the second pair of busbars;
   a first insulating layer positioned between the first pair of busbars and the second pair of busbars to electrically insulate the first phase of electricity from the second phase of electricity,
   wherein the first and the second pairs of busbars are arranged within the housing such that the first plurality of stabs and the second plurality of stabs are staggered, and wherein each of the first plurality of stabs and each of the second plurality of stabs are configured to be physically and electrically coupled with corresponding electrical connectors of two separate and distinct circuit breakers.

9. The load center of claim 8, wherein each of the first pair of busbars and each of the second pair of busbars have a respective substantially flat major surface and respective opposing edge surfaces, the first pair of busbars and the second pair of busbars being positioned within the housing such that (i) the respective opposing edge surfaces of the first pair of busbars are parallel with the respective opposing edge surfaces of the second pair of busbars and (ii) the respective substantially flat major surfaces of each of the first pair of busbars are parallel with the respective substantially flat major surfaces of each of the second pair of busbars.

10. The load center of claim 9, wherein the first pair of busbars has a first central axis located equidistantly between the first pair of busbars and the second pair of busbars has a second central axis located equidistantly between the second pair of busbars, the first central axis coinciding with the second central axis.

11. The load center of claim 10, wherein the first plurality of stabs and the second plurality of stabs are staggered such that respective portions of the first plurality of stabs and the second plurality of stabs alternate along the first central axis.

12. The load center of claim 11, wherein each of the first plurality of stabs and each of the second plurality of stabs have a circuit breaker connecting surface that is configured to physically and electrically couple with corresponding electrical connectors of two circuit breakers, each of the circuit breaker connecting surfaces being coplanar.

13. The load center of claim 9, wherein the first insulating layer includes a base portion and a plurality of phase barriers extending perpendicularly from the base portion, the base portion forming a substantially flat major surface that is sandwiched between the substantially flat major surfaces of the first pair of busbars and the substantially flat major surfaces of the second pair of busbars.

14. The load center of claim 13, wherein each of the phase barriers aids in electrically insulating the first phase of electricity from the second phase of electricity in response to one or more circuit breakers being electrically connected to the first plurality of stabs, the second plurality of stabs, or both.

15. The load center of claim 8, wherein each of the first plurality of stabs forms a bridge between the first pair of busbars to provide a bidirectional path for dissipating heat from each one of the first plurality of stabs to each one of the first pair of busbars, and each of the second plurality of stabs forms a bridge between the second pair of busbars to provide a bidirectional path for dissipating heat from each one of the second plurality of stabs to each one of the second pair of busbars.

16. The load center of claim 8, further comprising a third pair of generally parallel busbars, positioned within the housing, for distributing a third phase of electricity and a third plurality of stabs physically and electrically connected between the third pair of busbars, each of the third pair of busbars being physically separated from each other and having a respective substantially flat major surface and respective opposing edge surfaces, the third pair of busbars being positioned within the housing such that (i) the respective opposing edge surfaces of the third pair of busbars are parallel with the respective opposing edge surfaces of the first and the second pairs of busbars and (ii) the respective substantially flat major surfaces of each of the third pair of busbars are parallel with the respective substantially flat major surfaces of each of the first and the second pairs of busbars.

17. The load center of claim 16, further comprising a second insulating layer, the second insulating layer including a base portion and a plurality of phase barriers extending perpendicularly from the base portion, the base portion of the second insulating layer forming a substantially flat major surface that is sandwiched between the substantially flat major surfaces of the second pair of busbars and the substantially flat major surfaces of the third pair of busbars to electrically insulate the second phase of electricity from the third phase of electricity.

18. The load center of claim 17, further comprising a third insulating layer positioned adjacent to the respective substantially flat major surfaces of the third pair of busbars, the third insulating layer being coupled with the housing and configured to physically connect with corresponding connectors of a plurality of circuit breakers.

* * * * *